(12) United States Patent
Nunome et al.

(10) Patent No.: US 6,954,763 B2
(45) Date of Patent: Oct. 11, 2005

(54) MANAGEMENT SERVER DEVICE AND TERMINAL DEVICE FOR A CONTENTS PROVIDING SYSTEM

(75) Inventors: Toshiro Nunome, Saitama-Ken (JP); Motooki Sugihara, Saitama-Ken (JP); Toshiro Tanikawa, Saitama-Ken (JP)

(73) Assignee: Pioneer Corporation, Tokyo-to (JP)

( * ) Notice: Subject to any disclaimer, the term of this patent is extended or adjusted under 35 U.S.C. 154(b) by 465 days.

(21) Appl. No.: 10/212,232

(22) Filed: Aug. 6, 2002

(65) Prior Publication Data
US 2003/0028539 A1 Feb. 6, 2003

(30) Foreign Application Priority Data
Aug. 6, 2001 (JP) .................................... 2001-237546

(51) Int. Cl.⁷ ............................................. G06F 17/30
(52) U.S. Cl. ...................... 707/102; 707/10; 455/564; 455/412.1
(58) Field of Search ..................... 707/1–10, 100–104.1, 707/200–205; 455/564, 412.1; 709/223; 715/723; 705/27

(56) References Cited

U.S. PATENT DOCUMENTS

| 5,633,839 | A | | 5/1997 | Alexander et al. |
| 5,740,388 | A | * | 4/1998 | Hunt ........................... 715/723 |
| 5,864,868 | A | | 1/1999 | Contois |
| 6,389,467 | B1 | * | 5/2002 | Eyal ............................ 709/223 |
| 6,446,080 | B1 | | 9/2002 | Van Ryzin et al. |
| 2002/0156704 | A1 | * | 10/2002 | Kolis ........................... 705/27 |
| 2003/0134589 | A1 | | 7/2003 | Oba |

FOREIGN PATENT DOCUMENTS

GB  2 357 672 A  6/2001

* cited by examiner

*Primary Examiner*—Mohammad Ali
(74) *Attorney, Agent, or Firm*—Young & Thompson

(57) ABSTRACT

A management server device in a contents providing system can communicate with a user terminal through a communication network. The management server device includes a play-list creation device which creates a play list of contents based on user input to the user terminal, a storage device which stores the created play list in relation to a user, and a transmission device which acquires a play list from the storage device according to a request from the user terminal.

9 Claims, 10 Drawing Sheets

Fig. 3A

20: PROFILE TBL

| USER ID | PROFILE ATTRIBUTE | PROFILE DATA |
|---|---|---|
| Kotaro | PlayListID | Kota00001 |
| Kotaro | Initial menu ID | Menu100 |
| Kotaro | Routing TBL name | Route-Kota |
| Kotaro | LastPlayListID | Kota00010 |

Fig. 3B

21: PLAYLIST TBL

| PLAYLIST ID | PLAYLIST ATTRIBUTE | PLAYLIST DATA |
|---|---|---|
| Kota00001 | Title | My Best |
| Kota00001 | 1st PIECE | Uta0123FL |
| Kota00001 | 2nd PIECE | Uta0124FL |

Fig. 3C

22: SERVICE LOG TBL

| USER ID | DATE | TIME | SERVICE ATTRIBUTE | SERVICE DATA |
|---|---|---|---|---|
| Kotaro | 01/06/26 | 15:29 | CreatePlayList | Kota00001 |
| Kotaro | 01/06/10 | 18:55 | EditPlayList | Kota00001 |
| Kotaro | 01/06/12 | 20:25 | Playback | Kota00001 |

Fig. 4A

23:MENU TBL

| MENU ID | MENU ATTRIBUTE | MENU DATA | PARENT ID |
|---|---|---|---|
| Menu001 | Both | GENRE | Menu200 |
| Menu002 | Item | POP MUSIC | Menu001 |
| Menu003 | Item | ROCK MUSIC | Menu001 |
| Menu004 | Menu | PERIOD | NULL |
| Menu005 | Item | THE 1970'S | Menu004 |
| Menu006 | Item | THE 1980'S | Menu004 |
| Menu100 | Menu | TOP MENU | NULL |
| Menu101 | Item | CREATE PLAYLIST | Menu100 |
| Menu102 | Item | EDIT PLAYLIST | Menu100 |
| Menu103 | Item | RETRIEVE PLAYLIST | Menu100 |

Fig. 4B (Route-Kota)     24:ROUTING TBL

| ROUTE ID | MENU ID | NEXT MENU ID | PRIORITY |
|---|---|---|---|
| Route001 | Menu003 | Menu004 | 1 |
| Route002 | Menu003 | Menu010 | 2 |
| Route100 | Menu101 | Menu001 | 1 |
|  |  |  |  |
|  |  |  |  |

Fig. 6

52: CONTENTS MANAGEMENT
INFORMATION DB

| CONTENTS ID | MANAGEMENT INFORMATION ATTRIBUTE | CONTENTS MANAGEMENT INFORMATION |
|---|---|---|
| Uta0123FL | Title | Let It Be |
| Uta0123FL | Artist | Beatles |
| Uta0123FL | URL | http://conserv/uta0123.mp3 |
| Uta0123FL | GENRE | ROCK MUSIC |
| Uta0123FL | PRODUCTION DATE | 19??/??/?? |
| | | |
| | | |

ID, given to each piece of contents, and the contents management information may be, for example, details of the piece of contents, author, production date, and other related information.

MANAGEMENT SERVER DEVICE AND TERMINAL DEVICE FOR A CONTENTS PROVIDING SYSTEM

BACKGROUND OF THE INVENTION

1. Field of the Invention

The present invention relates to a system for delivering contents such as music to a user using a terminal device such as an audio instrument via a network.

2. Description of the Prior Art

Generally, when a user listens to favorite music by a conventional audio instrument, a packaged medium such as a CD (Compact Disc) and an MD (Mini Disc) is required. That is, the user listens to the favorite music by reproducing such a medium which the user has purchased, for example. Also, there is a radio broadcasting which does not require such a packaged medium.

On the other hand, as a method that does not require the above-mentioned packaged medium, there have been many attempts for delivering music through the Internet in recent years. However, in many of the above methods for music delivery through the Internet, music data themselves are downloaded to a terminal of a user and are stored in a storage medium in the terminal of the user. The user reproduces the stored data to listen to the music.

The user is required to buy a desired CD and so on, for example, at a CD shop according to the method for delivering contents by the packaged medium.

In the radio broadcasting, contents such as music are provided to the user according to programs decided on the side of a broadcasting station, and it is difficult to reflect user's preference in the provided contents such as music.

On the other hand, in the system for providing contents through a network, a user who desires to enjoy contents such as music is required to prepare a storage medium of a comparatively large capacity for storing music data in his or her terminal. Moreover, in order to rearrange and store the music data which have been downloaded from a server on the Internet and to select a desired music therefrom to listen, the user needs a high-performance application in his or her terminal to use contents after retrieval, arrangement, and so on.

Furthermore, in order to use the above high-performance application, the user is required to understand the functions of the application, and to have knowledge to use the application. Therefore, the user is not able to listen to the desired music in the same easy way as listening to music by reproducing a packaged medium by an audio reproduction device and so on after obtaining the medium.

SUMMARY OF THE INVENTION

The present invention has been made in consideration of the above problems, and the object of the invention is to provide a contents delivery system by which a user can receive a desired piece of contents with easy and simple operations without the need of a storage medium with a large capacity, a high-performance application, and so on.

According to one aspect of the present invention, there provided a management server device in a contents providing system which can communicate with a user terminal through a communication network, including: a play-list creation device which creates a play list of contents based on a user's input to the user terminal; a storage device which stores the created play list in association with a user; and a transmission device which acquires a play list from the storage device according to a request from the user terminal and transmits the list to the user terminal.

In accordance with the above management server device, the management server device can communicate with a user terminal through a communication network, and includes a storage device which stores a play list for contents. When the above server device receives a request for a play list from the user terminal, the server device acquires the play list from the storage device, and transmits the play list to the user terminal as a request source.

The play list may include identification information of the contents and management information associated with the contents. In this case, a play list includes identification information on a piece of contents included in the list, and management information. The identification information on the piece of contents may be, for example, a contents ID given to each piece of contents, and the contents management information may be, for example, details of the piece of contents, author, production date, and other related information.

The management information may include information representing a storage position on a contents delivery server device in which the contents are stored. Thus, a storage position on a contents delivery server at which a piece of contents included in a play list is saved is included in the play list. Therefore, it is possible, by acquiring the play list, to acquire data for a piece of the contents included in the play list based on information on the storage position.

Preferably, the management server device may further include a menu providing device which transmits menu data for displaying a menu screen on the user terminal to the user terminal. With this arrangement, a menu screen is displayed on a user terminal based on menu data transmitted from a management server device. The user may create a play list by necessary operations while seeing the menu screen.

In an embodiment, the menu providing device may include: a plurality of menu elements which form a plurality of menu screens; and routing data which defines, for each user, an order according to which a plurality of the menu screens are displayed. By this, a menu screen may be displayed in an order suitable for each user, as routing data are prepared for each user.

The menu providing device may further include a device which changes the contents of the routing data according to the user's input to the menu screen. By this, it becomes possible for a menu screen to be displayed at any time in an order suitable for the preference of a user and so on, because the contents of routing data are changed according to user's input.

The routing data may include priority data representing priority according to which a plurality of menu screens are displayed if there are a plurality of menu screens to be displayed after a specific menu screen. In this case, a lot of menus may be presented to a user in a systematized manner by establishing the relationship of a plurality of menu screens based on the priorities.

In a preferred embodiment, the play-list creation device may include: a condition decision device which decides contents-retrieval conditions based on the user input; a device which transmits the contents-retrieval conditions to an external contents delivery server device to execute retrieval; and a device which receives retrieval results from the contents delivery server device and which creates the play list based on the retrieval results. In this embodiment, retrieval conditions for contents are decided based on user's input and transmitted to an external contents delivery server for retrieval. The retrieval result is transmitted from the contents delivery server, and a play list is created based on the result. Thereby, the play list is created by contents obtained by the retrieval according to user's input.

The condition decision device may determine an option selected by the user's input, among options included in the menu screen, as a retrieval condition. By this, a user may directly select retrieval conditions, and a play list including contents which more directly reflect user's desire is created.

In an example, the contents may be music contents, and the play list may include names of music numbers, names of artists, identification information for a plurality of music contents and information representing an order according to which a plurality of the music contents are reproduced. In this example, a play list in which names of music numbers, and those of artists of music contents are described may be created.

According to another aspect of the present invention, there is provided a terminal device which can communicate with a management server device and a contents delivery server device through a communication network, including: a device which acquires a play list of contents from the management server device; a device which transmits a request for contents delivery of contents in the play list to the contents delivery server device; and a device which reproduces contents received from the contents delivery server device according to the play list.

In accordance with the above terminal device, a play list is acquired from a management server device, and a delivery request for contents including contents in the play list is transmitted to a contents delivery server device. The contents delivery server device delivers data of the contents included in the request to a terminal device, and the data are received and reproduced in the terminal device.

In a preferred embodiment, the terminal device may further include: a device which receives menu data including an option necessary for creating the play list from the management server device, and which displays a menu screen; and an input device which inputs the option to be selected. In this embodiment, when a user performs selection according to a menu screen provided from a management server device, a play list is created based on the selection.

In an example, the contents may be music contents, and the terminal device may be an audio system provided with a communication function through the communication network. In this case, a terminal device requests contents delivery to a contents delivery server device based on a play list acquired from a management server device, and music contents included in the play list may be acquired.

The nature, utility, and further features of this invention will be more clearly apparent from the following detailed description with respect to preferred embodiment of the invention when read in conjunction with the accompanying drawings briefly described below.

BRIEF DESCRIPTION OF DRAWINGS

FIG. 3 shows typical contents of a customer information extension database shown in FIG. 1;

FIG. 4 shows typical contents of a menu information database shown in FIG. 1;

FIG. 6 shows contents of a contents management information database shown in FIG. 1;

DETAILED DESCRIPTION OF PREFERRED EMBODIMENTS

Hereinafter, preferred embodiments of the present invention will be described by referring to the attached drawings.

[1] System Configuration

Figure 1:
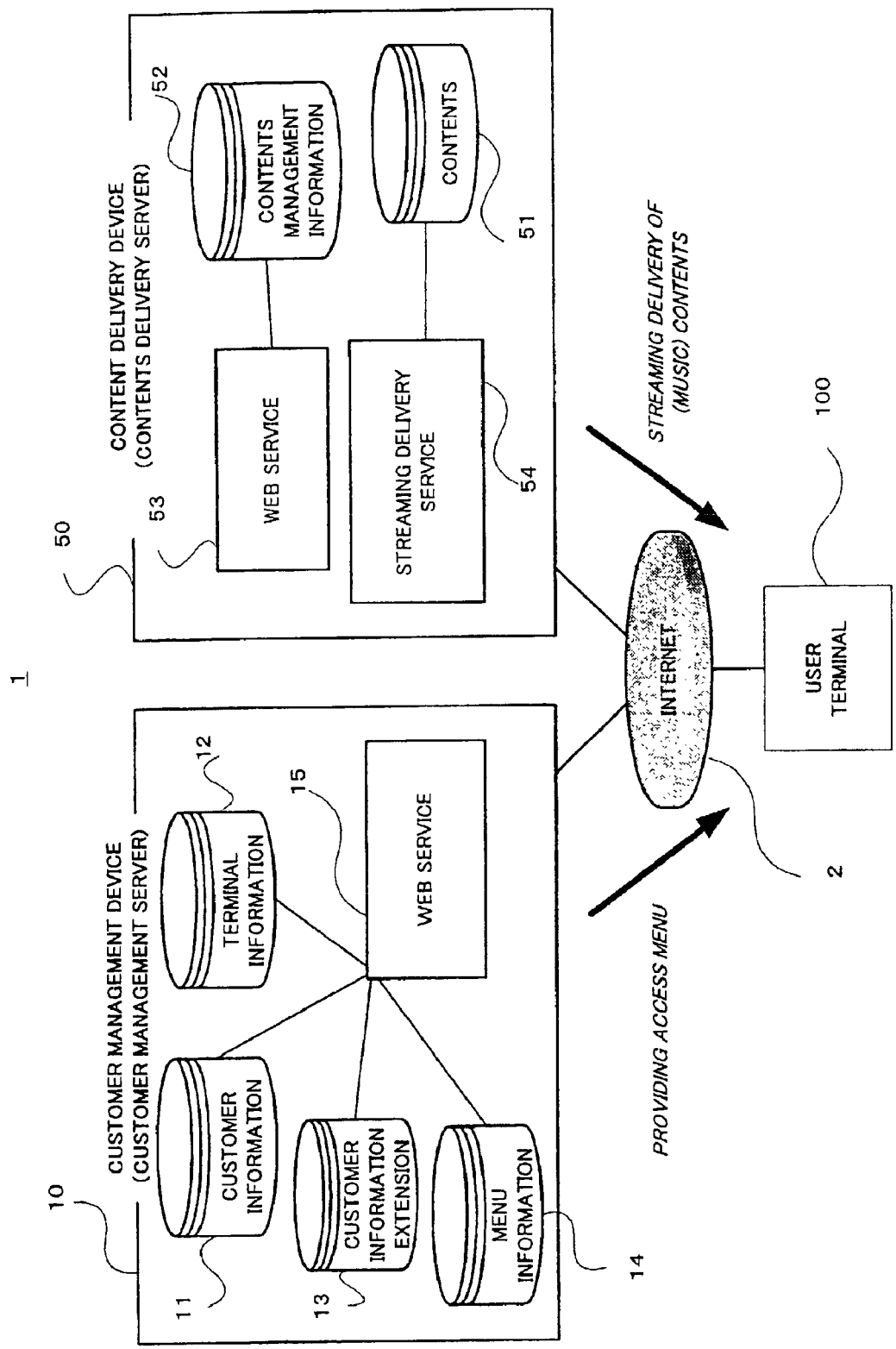
FIG. 1 is a block diagram showing a schematic configuration of a contents providing system according to the present invention.

A schematic configuration of a contents providing system 1 according to an embodiment of the present invention is shown in FIG. 1. The contents providing system 1 is a system for providing contents such as music to a user using a user terminal 100. The contents providing system 1 includes a customer management server 10 serving as a customer management device, and a contents delivery server 50 serving as a contents delivery device. Both of the customer management server 10 and the contents delivery server 50 can communicate with the user terminal 100 through the Internet 2. Here, the Internet 2 is merely an example, and the present system can be also configured so that the customer management server 10 and the contents delivery server 50 communicate with the user terminal 100 through another communication network other than the Internet.

While only one contents delivery server 50 is shown in FIG. 1 for convenient description, actually, music contents from a plurality of contents delivery servers 50 (such as music-medium production companies) are mixed together and delivered to the user terminal 100.

The customer management server 10 receives, by communicating with the user terminal 100, a selection, designation and so on of the music contents to which the user desires to listen, and produces a play list and sends it to the user terminal 100. The user terminal 100 connects to the contents delivery server 50, and receives the music contents in the play list by streaming delivery technique. Moreover, the customer management server 10 processes the play list by changing and/or deleting the music pieces and so on according to a user s request.

The contents delivery server 50 has a contents database (hereinafter, simply referred to as "DB") with a large capacity, and delivers, according to a request from the user terminal 100, contents stored in the database. Moreover, the contents delivery server 50 saves contents management information for management of the above contents, retrieves the contents management information according to a retrieval request and so on given from the customer management server 10, and returns the result to the customer management server 10.

A preferable example of the user terminal 100 is an audio system or an AV (audio visual) system and so on with a communication function. One specific example is a general audio system for reproduction of CDs, MDs, and so on, which also has a communication function through the Internet 2. In this case, the user performs various kinds of selection, designation and the like, including selection of contents by using, as a user interface, a remote controller of the audio system which functions as the user terminal 100.

Since the above audio system does not have a hard disk with a large capacity, unlike a personal computer or the like, contents such as music (hereinafter, called as "music contents"), which have been delivered from the contents delivery server 50, are simply reproduced. By operating the remote controller of the audio system, the user creates a play list including favorite music contents, or reproduces music contents according to a play list which has been previously created and registered in the customer management server 10. Therefore, the user may enjoy, in a similar sense to that of ordinary reproduction of music through CDs and MDs, music contents delivered from the contents delivery server 50 by operating the remote controller.

Moreover, a cellular telephone and various kinds of other terminal devices with a music reproduction function, as well as the above audio system, may be used as the user terminal 100. Basically, various kinds of terminal devices having a user interface and a communication function via a communication network such as the Internet may be used as the user terminal 100 according to the present invention.

Next, the contents delivery server 50 will be described in detail. As shown in FIG. 1, the contents delivery server 50 includes a contents DB 51, a contents management information DB 52, a web service unit 53, and a streaming delivery service unit 54.

The contents DB 51 stores various kinds of music contents in the form of music files and so on. The streaming delivery service unit 54 acquires music contents from the contents DB 51 in response to a request for music contents from the user terminal 100 based on the play list, and performs streaming delivery of the requested contents to the user terminal 100. Therefore, the music contents themselves are directly delivered from the contents delivery server 50 to the user terminal 100, without routing the customer management server 10.

The contents management information DB 52 stores contents management information. The contents management information is information accompanied by the contents, and includes, for example, the album name, the music title, the names of artists, the genre, the production date, and the address (URL and so on) of the music file in the contents DB 51 in the case of the music contents.

More particularly, the contents management information DB 52 stores the contents management information relating to the music contents which have been stored in the contents DB 51. One example of the contents management information DB 52 is shown in FIG. 6. In the example of FIG. 6, the contents management information DB 52 has three fields: i.e., a contents ID, a management information attribute and contents management information. The contents ID is an ID representing data themselves for each piece of the music contents, and is uniquely given to each piece of the contents. The management information attribute represents what kind of related information on each of the contents the contents management information is. For example, the management information attribute "Title" represents the title for each of the contents; the management information attribute "Artist" expresses the artist for each of the contents; and the management information attribute "URL" represents the storage address of the music file which is substance for each of the contents.

The web service unit 53 executes processing for necessary communication with the customer management server 10 and the user terminal 100 through the Internet 2, and for sending and receiving data to and from them.

Figure 2:
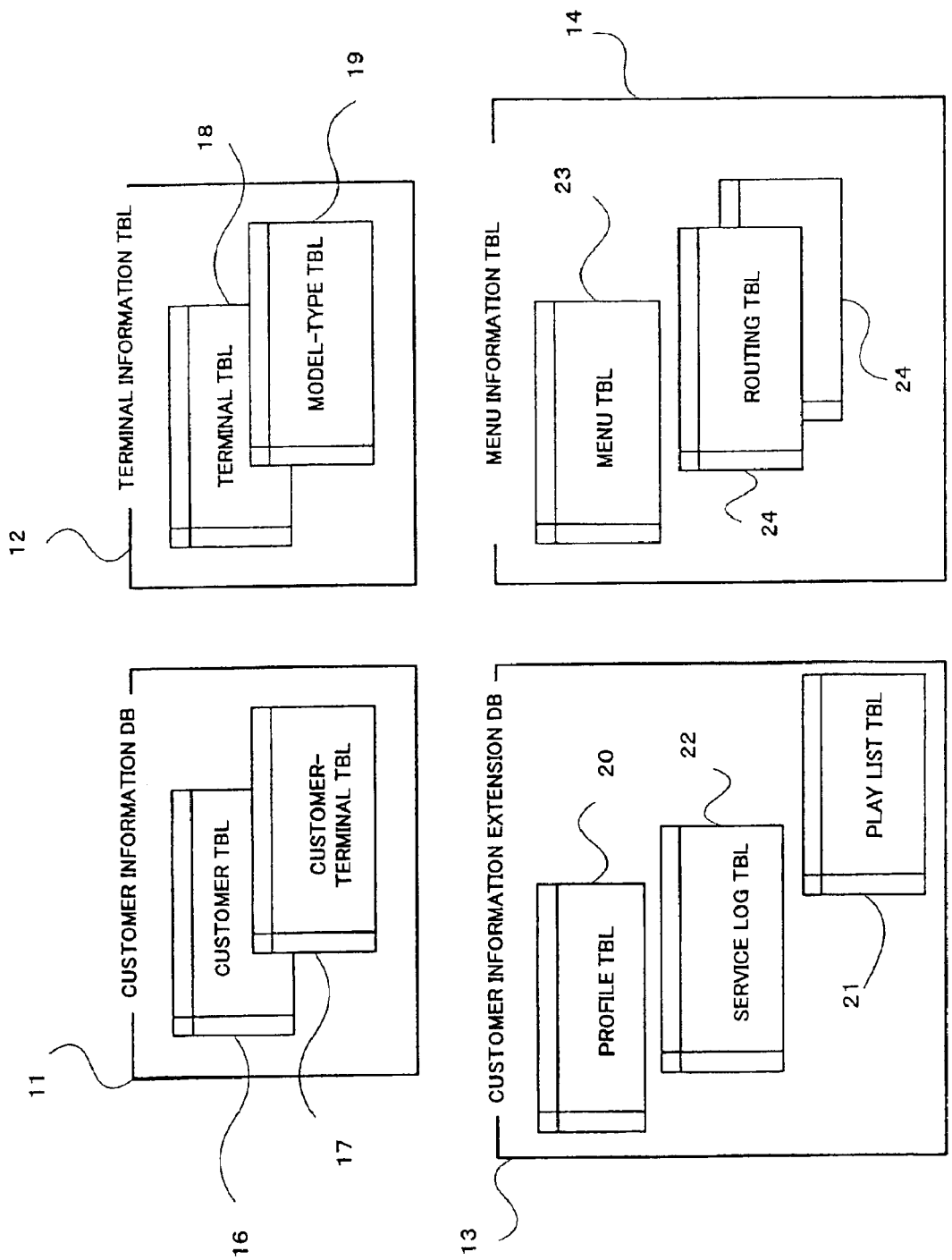
FIG. 2 is a block diagram showing a schematic configuration of each database in a customer management server shown in FIG. 1.

Next, the customer management server 10 will be described in detail. As shown in FIG. 1, the customer management server 10 includes: a customer information DB 11, a terminal information DB 12, a customer information extension DB 13, a menu information DB 14, and a web service unit 15. Configurations of the customer information DB 11, the terminal information DB 12, the customer information extension DB 13 and the menu information DB 14 are shown in FIG. 2.

The customer information DB 11 is a database for storing basic user information which has been previously collected, and includes a customer table 16 and a customer-terminal table 17. The customer table 16 stores basic information on the users such as names and addresses of users in correspondence to user IDs. Here, the user ID is a registered ID which is issued for each user by the customer management server 10. The customer-terminal table 17 stores correspondences between the user IDs assigned to each user and terminal IDs of the user terminals 100.

The terminal information DB 12 is a database for storing information relating to the user terminal 100 such as kinds and functions of the user terminal 100, and includes a terminal table 18 and a model-type table 19. The terminal table 18 stores correspondences between the above terminal IDs and the model-type IDs (or production numbers, and so on) of the user terminals. The model-type table 19 stores features (profiles) of the model-types of the terminal devices corresponding to each model-type ID. A feature of a model-type represents functions and performances which a terminal device with the model-type has, for example, including a method or a level for a copyright management function which the terminal device has, a method or a level for an illegal-copying prevention function, and so on. The customer management server 10 knows the functions of each user terminal 100 to judge what form of delivery service is suitable for the user terminal 100. For example, music contents are delivered from the contents delivery server 50 to the user terminal 100 according to a method suitable for the illegal-copying prevention function of the user terminal 100.

The customer information extension DB 13 is a database which stores information necessary for providing menus and contents customized for each user, and includes a profile table 20, a play list table 21 and a service log table 22.

The profile table 20 stores individual attribute information and so on set for each user. One example of the profile table 20 is shown in FIG. 3A. The profile table 20 includes, for each user ID, a profile attribute representing what kind of attribute is defined for the user, and profile data which represent actual contents of the attribute defined by the profile attribute. The profile table 20 stores regulations for various kinds of attribute information such as a play list ID representing play lists which the user has previously created, a last play list ID representing the latest play list which the user has reproduced and a routing table name (described later) of menus which the user uses, for example, at the time of creating a play list.

The play list table 21 is used for defining a play list which the user has. Here, the play list is a list of music contents such as songs, in which a plurality of music contents are arranged in a predetermined reproduction order. In this embodiment, the play list is created according to user's selection and so on, and is stored in the customer management server 10.

One example of the play list table 21 is shown in FIG. 3B. The play list table 21 has three fields, i.e., the play list IDs, the play list attributes and the play list data. The play list ID is an identification number of the play list, and one play list ID is given to one play list.

The play list attribute represents an attribute concerning the play list, and the play table data expresses data contents on the attribute defined by the play list attribute. In the first row in the example in FIG. 3B, it is shown that the title of a certain play list "Kota00001" is "My Best". The title is a name corresponding to the album name of a CD. The contents IDs of music contents corresponding to each music number, that is, the first music number, the second music contents, included in the play list, are described as play list data in the second and third rows in the example in FIG. 3B.

The service log table 22 is a table for saving log records for various kinds of services provided to users by the customer management server 10. One example of the service log table 22 is shown in FIG. 3C. The service log table 22 stores date and time when the services have been provided, service attributes and service data for each user ID of users to whom the customer management server 10 has provided services. The service attribute represents what kind of service is provided, and includes, for example, creation of a play list ("CreatePlayList"), reproduction of a play list ("Playback"), edition of a play list ("EditPlayList"), and so on. Here, the service log table 22 may be created for each user, or one service log table 22 may be made for a plurality of, or all the users.

The menu information DB 14 is used for providing an access menu to a user. Here, the access menu is provided from the customer management server 10 to the user terminal 100, when the user executes processing for creation of a play list, or other processing in the customer management server 10, and is an operation menu displayed on the user terminal 100. The menu information DB 14 includes a menu table 23, and a plurality of routing table 24 which has been created for each user.

The menu table 23 defines menu elements which are presented as an access menu to the user, and is shown in FIG. 4A as one example. The menu table 23 includes four fields, i.e., a menu ID, a menu attribute, menu data, and a parent ID.

The menu ID is identification information on each menu element forming the access menu. A menu attribute represents the attribute of a menu element, that is, how the menu element is used in the access menu. Moreover, the menu data represents data contents of the attribute which is defined by the menu attribute.

Here, in this specification, "Menu Element" means an element which forms the access menu, and corresponds to defined contents in each row of FIG. 4A. On the other hand, "Menu Item" represents an option which is used for actual display of the access menu, and corresponds to the menu data of a row in which the menu attribute is "Item" in FIG. 4A.

In the present embodiment, the menu attribute includes "Menu", "Item", and "Both". Here, "Menu" means an item which becomes a menu title in the access menu, and "Item" means an item which becomes a menu item (option) in the access menu.

For example, if the period of the music contents is noticed when the user retrieves the music contents, a menu title "Period" is displayed in the first place, and "The 1970's", "The 1980's", and so on are displayed as a menu item (option) belonging to the menu title. In this case, the attribute "Menu" corresponds to the menu title, and the attribute "Item" corresponds to an option belonging to the menu title.

The "Parent ID" representing a menu element to which the menu element is subordinate is given to the attribute "Item". The parent ID represents which menu title the menu element to which the parent ID is given is subordinate to. That is, in the example of FIG. 4A, the parent ID of Menu002 for which the attribute is "Item" is Menu001, and the title of Menu001 is "Genre". Therefore, it is defined that there is "Pop Music" as an option belonging to the menu title "Genre". Thus, the parent ID represents inclusion relation between the menu title and the menu item which is subordinate to the menu title.

Moreover, an attribute "Both" represents a menu element which may be used as an element with either of the attribute "Menu" or the attribute "Item". When the menu element with the attribute "Both" is used as an element with the attribute "Item", a parent ID is given to the element. When the menu element with the attribute "Both" is used as an element with the attribute "Menu", a parent ID is not defined (that is, "NULL" is set). Thus, the configuration of the access menu is defined by the menu table.

On the other hand, the routing table 24 represents a relation between menus, and includes four fields, i.e., a route ID, a menu ID, the next menu ID, and the priority. When the user executes selection, designation and so on, with seeing the access menu, a certain state of the menu display is moved to another state of the menu display by selecting an option in the certain state. Thus, the route ID defines a route for moving a certain menu to the next menu.

One example of the routing table 24 is shown in FIG. 4B. Here, the routing table name is "Route-Kota". In FIG. 4B, a route denoted by Route001 represents a route by which Menu004 is displayed when Menu003 is selected on a certain menu. Similarly, a route denoted by Route002 represents a route by which Menu010 is displayed next when Menu003 is selected. The menu may be always switched according to the route defined for the menu when the number of routes which are set for a certain menu is only one. However, the menu is switched, referring to "Priority" if a plurality of routes are set for a certain menu. In the example of FIG. 4B, as the priority of Route001 is higher than that of Route002, Menu004 is displayed in the first place after Menu003 is selected.

Figure 5:
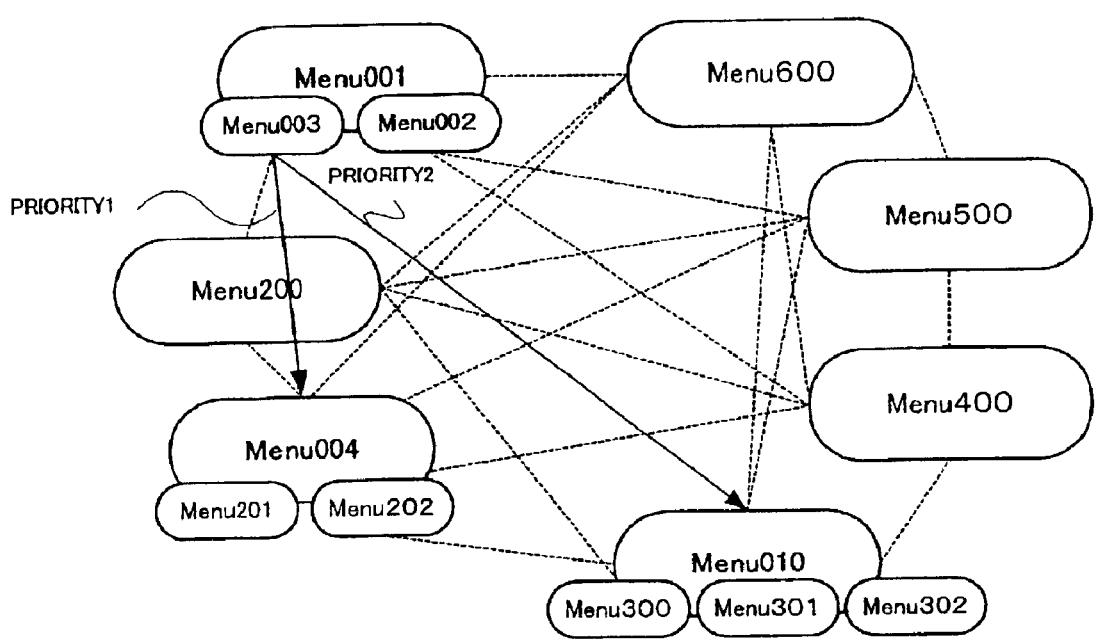
FIG. 5 is a schematic view of an example of a menu network defined by a routing table in the menu information database.

The above circumstances are schematically shown in FIG. 5. With regard to Menu003, Menu004 is defined with priority 1 in the first place, and, then, Menu010 is defined as priority 2 in the second place. Similarly, routes are defined for other menus.

The "Priority" maybe changed according to user's selection. When a menu is displayed on the user terminal 100, an item "Not significant" or "Do not care" is displayed in addition to the display items on the menu which are defined in the menu table 23. When the user selects the item "Not significant" or "Do not care", the priority of the route ID is set low.

Thus, the internal structure of each menu is defined by the menu table 23, and, at the same time, the whole structure of the access menu is defined by defining the structure between a plurality of menus in the routing table 24.

Furthermore, the web service unit 15 in the customer management server 10 has a function for necessary communication with the contents delivery server 50 and the user terminal 100 through the Internet 2.

[2] System Operation

Then, the operation of the contents providing system according to the present invention will be described. In the present system, processing for creating a play list, and processing for delivering music contents according to the play list are executed as basic processing. Hereinafter, description will be sequentially made.

(1) Processing for Creating a Play List

Figure 7:
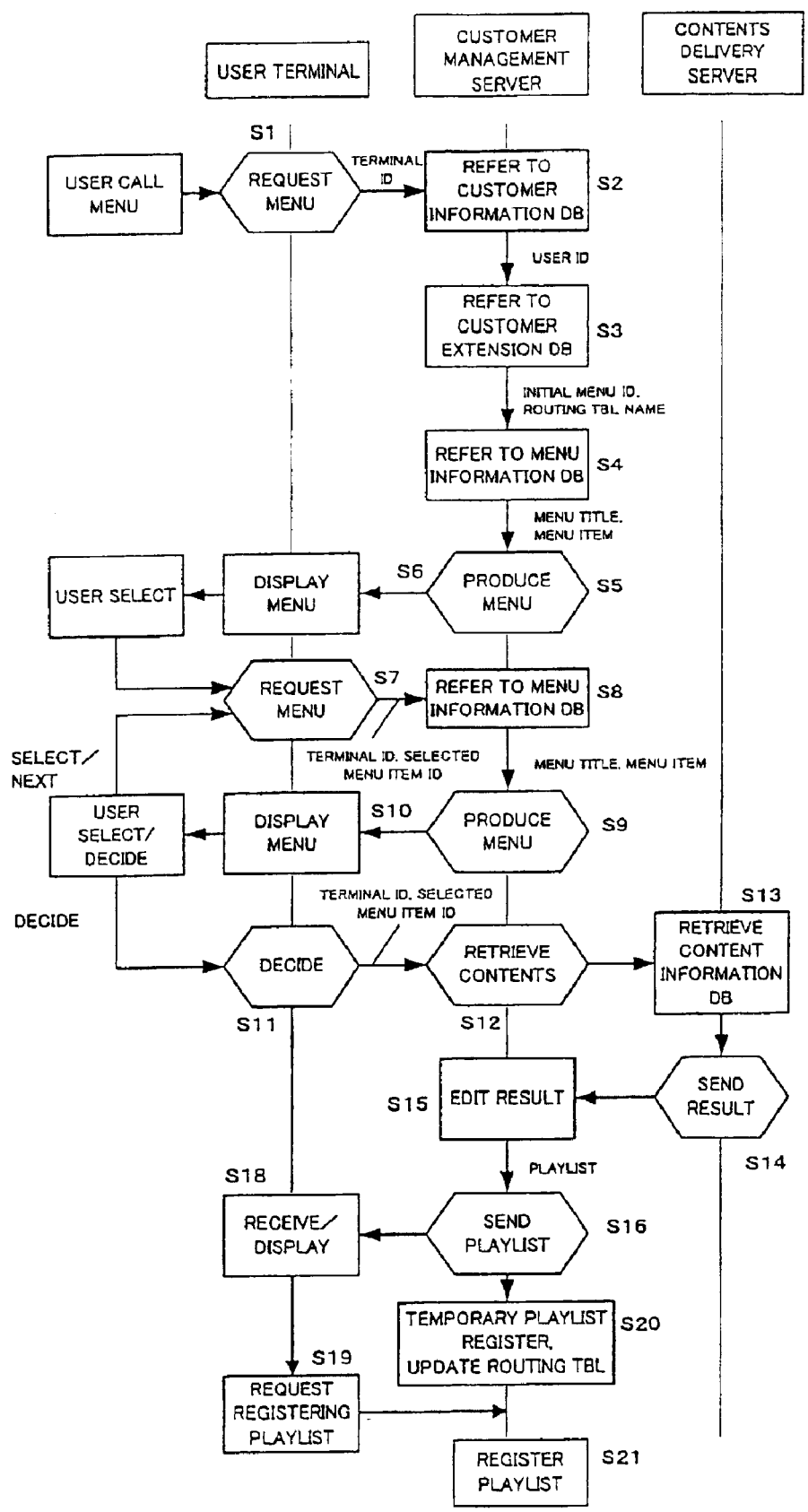
FIG. 7 is a flow chart of processing for creating a play list.

In the first place, processing by which a user creates a play list will be described by referring to FIG. 7 and FIG. 8. FIG. 7 is a flow chart of the processing for creating a play list, and FIG. 8A to FIG. 8E are examples of menu screens displayed on the user terminal 100 during the processing for creating a play list.

First of all, the user has access to the customer management server 10, using the user terminal 100, and makes a request for a menu screen (Step S1). In this case, the user terminal 100 includes the own terminal ID in the request for the menu screen. Normally, the own terminal ID has been previously registered in an internal memory of the user terminal 100, and the own terminal ID is included, for transmission, in the display request for the menu screen, after the user terminal 100 automatically acquires the own terminal ID from the internal memory at the time of requesting the menu screen by user's operation of the user terminal 100.

The customer management server 10 receives the request for the menu screen from the user terminal 100, and acquires the user ID of the user from the terminal ID included in the request for the menu screen, by referring to the customer-terminal table 17 in the customer information DB 11 (Step S2).

Subsequently, the customer management server 10 acquires an initial menu ID set for the user, and, at the same time, a routing table name corresponding to the user, by referring to the profile table 20 in the customer information extension DB 13 (Step S3). Specifically, the customer management server 10 specifies a profile data with the profile attribute of "Initial menu ID" with regard to the user ID of the user in the first place, by using the profile table 20 in the customer information extension DB 13. The above profile data is "Menu100" in the example of FIG. 3A. Then, apiece of data with a profile attribute of "Routing Table Name" is specified. Thereby, a routing table 24 for the user is specified, by using a plurality of routing tables 24 in the menu information DB 14.

Then, the customer management server 10 acquires a menu element corresponding to the menu ID "Menu100" by referring to the menu information DB 14, and creates a menu (Step S5). Specifically, the customer management server 10 acquires menu data corresponding to the menu ID "Menu100" from the menu table 23 in the menu information DB 14. Thereby, "Top menu" is acquired as a menu title in the example of FIG. 4A.

Then, the customer management server 10 similarly acquires a menu element having a menu I D "Menu100" as a parent ID by referring to the menu table 23. Thereby, "Creation of PlayList", "Edition of Play List" and "Retrieval of Contents" are obtained as menu items in the example of FIG. 4A. Then, the customer management server 10 creates an initial menu from the menu title and the menu items which have been obtained.

Subsequently, the customer management server 10 transmits the created menu to the user terminal 100 for display (Step S6). Here, the initial menu corresponds to a menu at the most significant hierarchical level among a plurality of menu screens which have been previously prepared.

Figure 8A:
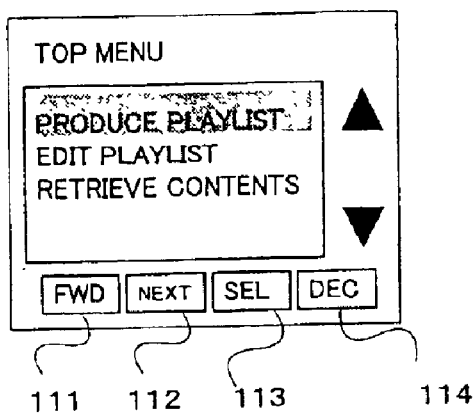
FIGS. 8A to 8E are examples of a display screen during processing for creating a play list.

The display example of the initial menu in the above case is shown in FIG. 8A. The menu title is "Top Menu", and "Creation of Play List", "Edition of Play List" and "Retrieval of Contents" are displayed as menu titles (options) subordinate to the above title.

Here, the user selects any of the menu items, and requests a menu (Step S7). In the example of FIG. 8A, the user moves a cursor to any one of menu items, and pushes a selection button 113 for selection of a menu item. The above request for a menu includes the terminal ID of the user terminal which the user is using, and a menu ID of the menu item which the user has selected.

The customer management server 10 specifies a menu title and a menu item corresponding to the menu ID which the user has specified (Step S8). When it is assumed in the above example that the user selects "Creation of Play List", a menu title to be displayed next is "Genre", and "Pop Music" and "Rock Music" are acquired as the menu item, because a menu ID "Menu001" corresponding to "Genre" is defined to be displayed after the menu ID "Menu101" corresponding to "Creation of Play List" as shown in the route ID "Route100" of FIG. 4B. Moreover, when a plurality of route IDs are set for the same menu ID in the routing table 24, a route ID is determined according to the priorities.

Then, the customer management server 10 creates a menu screen (Step S9) by using the menu title and the menu items which have been acquired as described above, and transmits the screen to the user terminal 100 (Step S10). The display example on the user terminal 100 in the above case is shown in FIG. 8B.

Figure 8B:
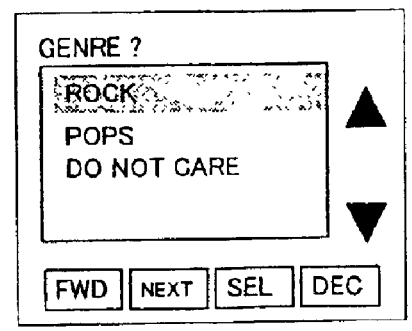

When the user selects "Rock Music" on a menu screen with a menu title "Genre" as shown in FIG. 8B and a button of "Selection", Steps S7–S10 are repeated, and a menu screen for a menu title "Period" is displayed on the user terminal 100 in the same way.

Figure 8C:
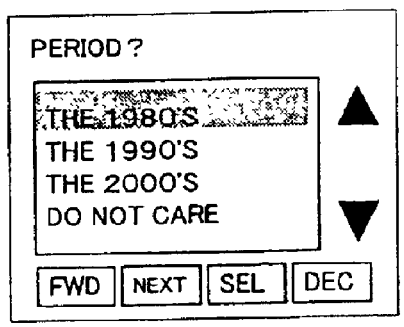

Thus, the user selects menu items for a plurality of menu titles as required. FIG. 8C shows an example in which the user further selects "The 1980's" on a menu screen of a menu title "Period".

At Step S7, regardless of the hierarchical levels of the menus, the selection results for the menus displayed at Step S6 and Step S10 are transmitted from the user terminal 100 to the customer management server 10, and are preserved in the customer management server 10.

When the user pushes a "Decision" button 114 after processing at Steps S7–S10 is repeated several times, and menu screens at a plurality of hierarchical levels are displayed on the user terminal 100, the user terminal 100 transmits a decision instruction including menu IDs of menu items which the user has selected at that time to the customer management server 10 (Step S11).

When the customer management server 10 receives the decision instructions from the user terminal 100, the server 10 creates a request for contents retrieval, based on menu IDs included in the decision instruction and the menu IDs (stored in the internal memory in the customer management server 10 as described above) included in the menu requests (Step S7) which have been made before, and transmits the request to the contents delivery server 50 (Step S12). Here, the request for contents retrieval includes retrieval conditions based on the menu IDs which the user has selected. For example, when it is assumed that the user selects "Rock Music" and "The 1980's" in FIG. 8B and FIG. 8C, respectively, a request for contents retrieval which is transmitted from the customer management server 10 to the contents delivery server at Step S12 includes "Rock Music" and "The 1980's" as retrieval conditions. Furthermore, the customer management server 10 may transmit the request for contents retrieval to a plurality of the contents delivery servers 50.

The contents delivery server 50 executes retrieval in the contents management information DB 52 (Step S13) according to the retrieval conditions included in the request for contents retrieval, and the obtained retrieval results are transmitted to the customer management server 10 (Step S14). Here, in this example, contents IDs obtained by the retrieval, and names of music numbers and those of artists corresponding to the above contents IDs are transmitted to the customer management server 10 as retrieval results.

The customer management server 10 receives the retrieval results from the contents delivery server 50, and creates play lists based on the above results (Step S15). That is, a suitable reproduction order is determined for the contents IDs included in the retrieval results, and a play list table is created as illustrated in FIG. 3B. Moreover, when the customer management server 10 transmits a request for contents retrieval to a plurality of contents delivery server 50, a play list is created by organizing the retrieval results received from a plurality of contents delivery servers 50.

Figure 8D:
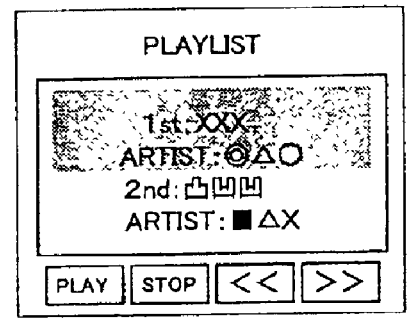

Subsequently, the customer management server 10 transmits the created play list to the user terminal 100 (Step S16). The user terminal 100 receives and displays the play list (Step S18) A display example of the play list is shown in FIG. 8D. The user decides, with seeing the displayed play list, whether or not the play list is to be registered in the customer management server 10. When registration is required, an instruction for the registration is transmitted to the customer management server 10 (Step S19). It is noted that the retrieval results may be registered without changing the contents and the order of music numbers, and may be registered after changing the order of the music numbers or selection of them.

The customer management server 10 provisionally registers the play list as a provisional play list in the play list table 21 of the customer information extension DB 13 after transmitting the play list to the user terminal 10 at Step S16. A predetermined maximum number of play lists (for example, five lists) may be provisionally registered in this manner. Thereby, the retrieval results themselves can be preserved as provisional play lists for reuse.

Furthermore, the customer management server 10 changes, as required, the content of the routing table 24 in the menu information DB 14 (Step S20) according to selection of the user which has been made in processing at Steps S6–S12.

Then, the customer management server 10 formally registers (Step S21) the pertinent play list which has been provisionally registered, when receiving from the user terminal 100 the instruction to register the play list. Here, when the user specifies a title of a play list, the play list is preserved in the play list table 21 with that title. Thus, the processing for creating a play list is completed.

Figure 8E:

FIG. 8E shows a display example of a play list (the user is assumed to give the title "My Best" to the list) which is created as described above. The names and the artists for each music numbers included in the play list are displayed.

(2) Play-List Reproduction Processing

Figure 9:
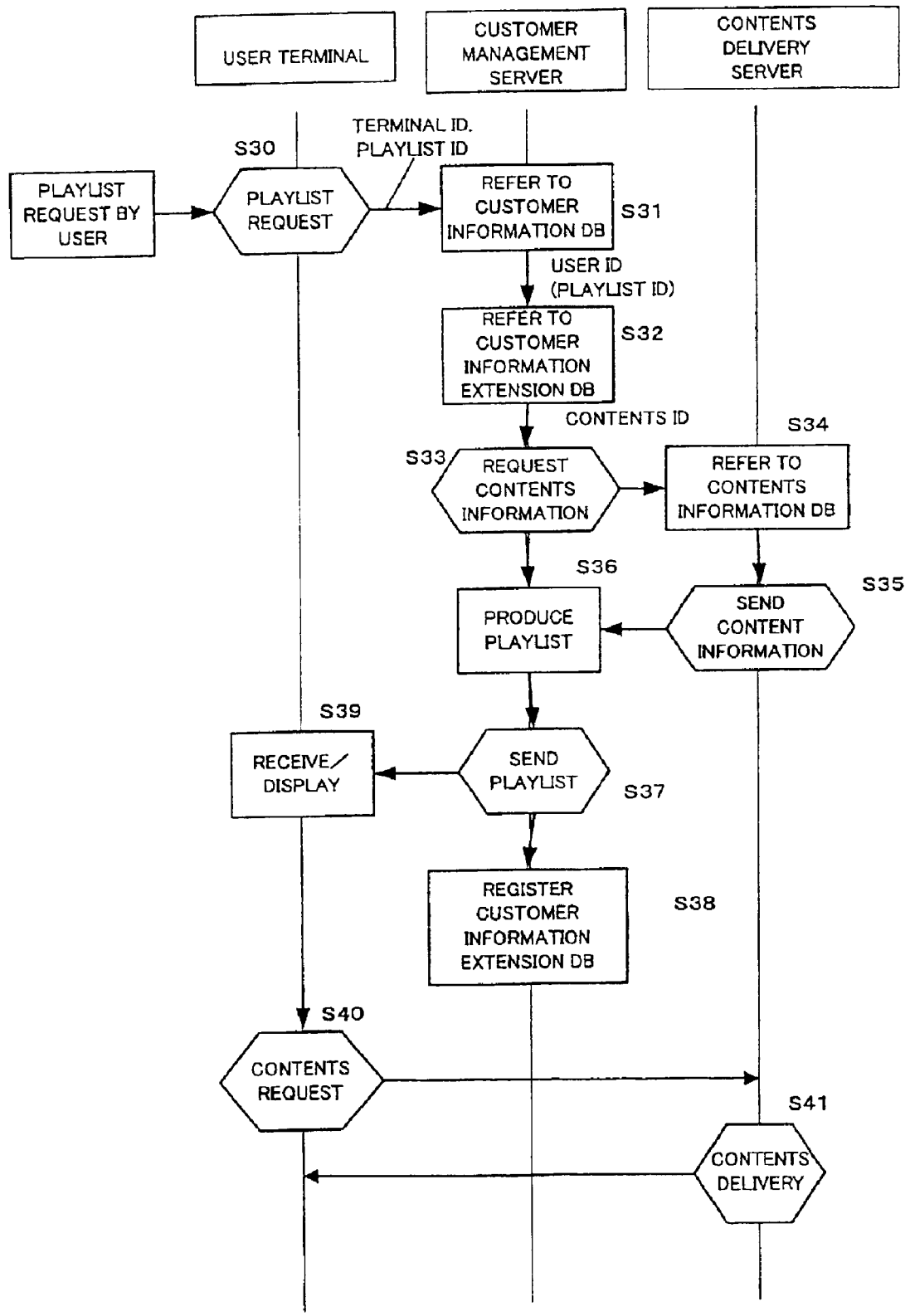
FIG. 9 is a flow chart of processing for reproducing a play list.

Then, play-list reproduction processing in which pieces of contents are reproduced according to a play list created as described above will be described by referring to FIG. 9 and FIG. 10. FIG. 9 is a flow chart for the play-list reproduction processing, and FIG. 10 is a display-screen example during processing for reproducing a play list.

First of all, the user accesses the customer management server 10, using the user terminal 100, and transmits a request for a play list (Step S30). The above request for a play list includes a terminal ID of the user terminal 100 which the user is using, and a play list ID of a play list which the user desires.

Figure 10A:
FIGS. 10A and 10B are examples of a display screen during processing for reproducing a play list.

As a method for specifying a play list, for example, a title (such as "My Best" which has been described) of a play list created by the user and registered in the customer management server 10 may be specified for request. Alternatively, for example, another method may be as follows. When the user inputs a user ID and so on, the customer management server 10 displays on the user terminal 100 the table data, as shown in FIG. 10A, of play lists which have been already registered for the user, and a play list which the user desires may be selected by the user from the table data.

Based on a terminal ID included in the received request for the play list, the customer management server 10 acquires a user ID by referring to the customer-terminal table 17 in the customer information DB 11 (Step S31). Then, the customer management server 10 acquires contents IDs corresponding to play list IDs included in the request for the play list (Step S32), by referring to the play list table 21, and transmits a request for contents management information including the above contents IDs to the contents delivery server 50 (Step S33). It is noted that the customer management server 10 may request contents management information to a plurality of contents delivery servers 50 in some cases.

When receiving the request for contents management information, the contents delivery server 50 acquires the contents management information corresponding to the requested contents ID by referring to the contents management information DB 52, and transmits the information to the customer management server 10 (Step S36). Here, the above contents management information includes album titles, names of music numbers, artist names, contents storage addresses (URL), and so on for each piece of music contents.

Subsequently, the customer management server 10 receives the contents management information, creates play list data based on the information (Step S36), transmits the above data to the user terminal 10 (Step S37), and, at the same time, stores log information in a service log 22 of the customer management information extension DB 13 (Step S38). In this case, for example, the service attribute in FIG. 3C is described as "Request for Play list", and a play list ID is described in service data.

The user terminal 100 receives the play list, and transmits a request for contents delivery including a contents ID included in the play list to the contents delivery server 50 (Step S40). It is noted that the request for contents delivery is transmitted to a plurality of the contents delivery servers 50, if necessary.

The contents delivery server 50 receives the request for contents delivery from the user terminal 100, acquires contents data (music file) from the contents DB 51 based on the contents ID included in the request, and performs streaming delivery of the data to the user terminal 100 (Step S41). Thereby, the user may reproduce the music data after streaming delivery from the contents delivery server 50.

Figure 10B:

A display-screen example on the user terminal 100 during reproducing a play list is shown in FIG. 10B. In this example, related information (names of music numbers and those of artists) included in a play list having a title "My Best" is displayed, and the first music number is being currently reproduced. Here, reproduction of music numbers is controlled by user's selection of a reproduction button, a stop button, and so on.

Moreover, the request for contents delivery from the user terminal 100 is sequentially transmitted, according to the order defined for each music contents in the play list, to the contents delivery server 50 including the contents storage addresses (URLs). As a result, each piece of music contents is provided to the user terminal 100 in the order defined by the play list.

While the processing for requesting a play list in an ordinary state of the user terminal 100 has been described above, the system may be also configured so that a play list is automatically acquired at starting the user terminal 100. In the above case, the last play list (refer to FIG. 3A) which has been registered in the profile table 20 of the customer management server 10 is used. That is, when the user starts up the user terminal 100, the request for a play list (in this case, the terminal ID is included, but the contents ID is not included) is automatically transmitted to the customer management server 10. Thereafter, the customer management server 10 receives, from the contents delivery server 50, contents management information on a play list registered as the last play list in the profile table 20, creates a play list and transmits the list to the user terminal 100.

[3] Variation Example

In the example of processing for reproducing a play list, which has been described by referring to FIG. 9, after the customer management server 10 specifies a play list at Step S32, a request for the contents management information is made to the contents delivery server 50 at Step S33. Alternatively, if it is configured that the acquired contents management information is stored in the customer management server 10 at first creation of a play list, the customer management server 10 is not required to connect to the contents delivery server 50 to acquire the contents management information on the contents included in the play list every time there is a request for the play list from the user.

While the routing table 24 of the menu information DB 14 in the customer management server 10 is changed according to a menu selected by the user in the above-described embodiments, the invention is not limited to the above embodiment. Namely, the contents of the routing table 24 may be changed based on other information. For example, information on the age, sex, preference and so on of the user may be stored in the profile table 20 of the customer information extension DB 13. An operation history, including other operations as well as the contents retrieval by the user, may also be stored in the service log table 22 in the customer information extension DB 13. Then, the routing table 24 is rewritten, by using the above information and history, to form a menu system more convenient for an individual user.

Furthermore, it is also possible to change the contents of the menu table 23 itself. For example, a new menu may be created by collecting menu items which the user often selects, with considering the history and so on recorded in the service log table 22.

While music contents such as a music number are used as contents in the above-described embodiment, the present invention is not limited to the above embodiment. The present invention maybe applied to other contents such as video contents, news story and/or reports, etc.

As described above, according to the contents providing system of the present invention, the play lists is never lost even if a fault occurs in a user terminal, because a customer management server collectively manages the play lists of each user. Moreover, the play lists may be shared among a plurality of users, because the play lists are collectively managed.

Furthermore, the play lists may be freely customized by users. Even when contents included in the play lists are delivered from different kinds of contents delivery servers, a user may acquire contents from a plurality of contents delivery server without recognizing the difference in the kind between contents delivery servers. Namely, the user can obtain the contents in a similar sense to that of a case in which media such as a CD are reproduced by a general audio system.

Furthermore, as operation of selections for menus and so on may be realized by using a simple input device such as a remote controller of an audio system or a cellular telephone, a user may obtain a desired piece of contents with easy operations, without requiring any special knowledge on a personal computer and so on. As a menu configuration is changed according to a past operation history of a user and so on, menus may be efficiently displayed to each user, and the users can obtain easily target contents.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Applications No. 2001-237546 filed on Aug. 6, 2001 including the specification, claims, drawings and summary is incorporated herein by reference in its entirety.

What is claimed is:

1. A management server device in a contents providing system which can communicate with a user terminal through a communication network, comprising:

a play-list creation device which creates a play list of contents based on a user's input to the user terminal;

a storage device which stores the created play list in association with a user;

a transmission device which acquires a play list from the storage device according to a request from the user terminal and transmits the list to the user terminal, and a menu providing device which transmits menu data for displaying a menu screen on the user terminal to the user terminal, wherein the menu providing device comprises i) a plurality of menu elements which form a plurality of menu screens;

ii) routing data which defines, for each user, an order according to which a plurality of the menu screens are displayed; and iii) a device which changes the contents of the routing data according to the user's input to the menu screen, wherein the play-list creation device comprises:

a condition decision device which decides contents-retrieval conditions based on the user input;

a device which transmits the contents-retrieval conditions to an external contents delivery server device to execute retrieval; and a device which receives retrieval results from the contents delivery server device and which creates the play list based on the retrieval results.

2. A management server device according to claim 1, wherein the play list includes identification information of the contents and management information associated with the contents.

3. A management server device according to claim 2, wherein the management information includes information representing a storage position on a contents delivery server device in which the contents are stored.

4. A management server device according to claim 1, wherein the routing data includes priority data representing priority according to which a plurality of menu screens are displayed if there are a plurality of menu screens to be displayed after a specific menu screen.

5. A management server device according to claim 1, wherein the condition decision device determines an option selected by the users input, among options included in the menu screen, as a retrieval condition.

6. A management server device according to claim 1, wherein the contents are music contents, and wherein the play list includes names of music numbers, names of artists, identification information for a plurality of music contents and information representing an order according to which a plurality of the music contents are reproduced.

7. A terminal device which can communicate with a management server device and a contents delivery server device through a communication network, comprising:

- a device which acquires a play list of contents from the management server device;
- a device which transmits a request for contents delivery of contents in the play list to the contents delivery server device;
- a device which reproduces contents received from the contents delivery server device according to the play list; and
- a menu receiving device which receives menu data for displaying a menu screen on the user terminal from the management server, wherein the menu data includes i) a plurality of menu elements which form a plurality of menu screens; and ii) routing data which defines, for each user, an order according to which a plurality of the menu screens are displayed, the contents of the routing data changed according to the user's input to the menu screen, and the play-list creation device comprises:

- a condition decision device which decides contents-retrieval conditions based on the user input;
- a device which transmits the contents-retrieval conditions to an external contents delivery server device to execute retrieval; and
- a device which receives retrieval results from the contents delivery server device and which creates the play list based on the retrieval results.

8. A terminal device according to claim 7, wherein the menu receiving device further comprises:

- a device which receives the menu data including an option necessary for creating the play list from the management server device, and which displays a menu screen; and
- an input device which inputs the option to be selected.

9. A terminal device according to claim 8, wherein the contents are music contents, and wherein the terminal device is an audio system provided with a communication function through the communication network.

* * * * *